US009959681B2

(12) United States Patent
Jeong

(10) Patent No.: US 9,959,681 B2
(45) Date of Patent: May 1, 2018

(54) AUGMENTED REALITY CONTENTS GENERATION AND PLAY SYSTEM AND METHOD USING THE SAME

(71) Applicant: Ji-Yeon Jeong, Seoul (KR)

(72) Inventor: Ji-Yeon Jeong, Seoul (KR)

(*) Notice: Subject to any disclaimer, the term of this patent is extended or adjusted under 35 U.S.C. 154(b) by 0 days. days.

(21) Appl. No.: 15/324,801

(22) PCT Filed: Jul. 9, 2015

(86) PCT No.: PCT/KR2015/007126
§ 371 (c)(1),
(2) Date: Jan. 9, 2017

(87) PCT Pub. No.: WO2016/006946
PCT Pub. Date: Jan. 14, 2016

(65) Prior Publication Data
US 2017/0200314 A1    Jul. 13, 2017

(30) Foreign Application Priority Data

Jul. 9, 2014   (KR) .................. 10-2014-0085774
Apr. 21, 2015  (KR) .................. 10-2015-0056020

(51) Int. Cl.
*G09G 5/00*    (2006.01)
*G06T 19/00*   (2011.01)
(Continued)

(52) U.S. Cl.
CPC ........ *G06T 19/006* (2013.01); *G06K 9/00711* (2013.01); *G06K 9/2063* (2013.01); *H04N 5/23293* (2013.01); *H04N 5/772* (2013.01)

(58) Field of Classification Search
CPC .................. G02B 27/017; G02B 2027/0138
See application file for complete search history.

(56) References Cited

U.S. PATENT DOCUMENTS

2011/0063512 A1* 3/2011 Leichsenring ........ G06T 19/006
                                                 348/589
2012/0057844 A1* 3/2012 Mizuno .................. H04N 5/232
                                                 386/224

FOREIGN PATENT DOCUMENTS

KR   10-2011-0107542     10/2011
KR   10-2012-0081874      7/2012
(Continued)

OTHER PUBLICATIONS

International Search Report for International Application No. PCT/KR2015/007126, dated Aug. 19, 2015.

*Primary Examiner* — Thomas Lett
(74) *Attorney, Agent, or Firm* — Kile Park Reed & Houtteman PLLC

(57) ABSTRACT

The present disclosure relates to an augmented reality contents generation and play system. The augmented reality contents generation and play system includes an image acquisition unit configured to include a preview mode in which an image which is input through a lens is displayed on a screen and a shooting mode in which, if an image to be shot is displayed in the preview mode, the image is captured by operating a shooting button and the captured image is converted into an image file; a storage unit configured to store an image which is obtained from the image acquisition unit when the shooting button is pressed and video information which is automatically obtained for a predetermined time based on a shooting point of time; a mapping unit configured to map the image which is stored in the storage unit onto a video which is stored in the storage unit; an augmented reality processing unit configured to recognize an image corresponding to a marker from the image which is obtained by the image acquisition unit, configured to call the video mapped onto the image, and configured to overlay the video on a position of the marker on a screen in the (Continued)

preview mode; and a control unit configured to control a process of generating and playing contents by using an augmented reality contents.

16 Claims, 19 Drawing Sheets

(51) Int. Cl.
*H04N 5/232* (2006.01)
*H04N 5/77* (2006.01)
*G06K 9/00* (2006.01)
*G06K 9/20* (2006.01)

(56) References Cited

FOREIGN PATENT DOCUMENTS

KR  10-2012-0099814  9/2012
KR  10-2013-0014760  2/2013

* cited by examiner

AUGMENTED REALITY CONTENTS GENERATION AND PLAY SYSTEM AND METHOD USING THE SAME

RELATED APPLICATIONS

This application claims priority and the benefit of Korean Patent Application No. 10-2014-0085774, filed on 9 Jul. 2014, and 10-2015-0056020, filed on 21 Apr. 2015 in the Korean Intellectual Property Office, the entire contents of which are incorporated herein by reference in their entirety.

BACKGROUND

1. Field

An exemplary embodiment according to the concept of the present invention relates to an augmented reality contents generation and play system and a method thereof, and particularly, to an augmented reality contents generation and play system and a method thereof which, when a video is shot by a mobile communication device such as a smart phone, easily generates and plays augmented reality contents by automatically storing videos before and after a shooting point of time and automatically storing a marker together, and at this time, can increase a resolution of the marker, can confirm quality of the marker to select, and can automatically extract the marker through a general video file.

2. Description of the Related Art

Recently, various contents which use a virtual object such as virtual reality or augmented reality have been proposed.

Generally, the virtual reality (VR) is a virtual space which is created by an artificial technology by using a computer or the like, and has a feature in which the virtual reality is similar to reality but not reality.

In addition, the augmented reality (AR) is a field of the virtual reality, and is a computer graphic technology by which the augmented reality appears to be an object existing in an original environment by combining a virtual object with an actual environment.

The augmented reality application has a feature in which the augmented reality can give a user enhanced reality by interacting the user with the virtual object, based on the real world.

Hence, the user recognizes an actual environment in which he stays and, at the same time, the user also recognizes virtual information that is displayed on an actual screen, in the augmented reality.

Since the augmented reality shows a real image and virtual graphics which are combined together, desired objects have be accurately located at a desired position on a screen so as to obtain a realistic and accurate image. In order to realize this, three dimensional coordinates for a virtual object are required, and the coordinates have to be coordinates based on a camera.

However, it is a problem that three dimensional coordinates of the camera on a certain point or an object in a real world have to be secured. In order to secure the three dimensional coordinates, two or more cameras are required, and thus, it is not easy to recognize a three dimensional position.

Hence, as a measure against this, a marker-based recognition technology is used which estimates a position where a virtual object stays and a posture by disposing a marker at which the virtual object is located in a space of a real world and by extracting relative coordinates based on the marker, in the augmented reality.

For example, a user arbitrarily makes a marker which means a cat, and a three dimensional virtual image in which an image of a real cat is embodied as a three dimensional graphic image is matched with the cat marker. If the marker is recognized by image recognition means such as a camera connected to a computer, a monitor of the computer displays the three dimensional virtual image.

As such, augmented reality contents are created through a complex process of generating the augmented reality contents by using a photo object and an image object.

That is, the augmented reality contents are created through a process of generating image contents that are real objects, generating image contents which are virtual objects, mapping the real object (image) onto the virtual object (image), printing the image contents, and calling the mapped image contents by recognizing the image contents as a marker.

As such, the augmented reality contents generation and play system of the related art has to include various devices, such as, a device for obtaining an image and a video, such as a camera, and a device for playing contents, and thus, the system has a problem that requires much cost for generating contents.

In addition, there is a problem in which a process of generating and playing the augmented reality contents is complicated because the system uses various devices and thereby it is difficult for an ordinary people to easily make the system.

The present disclosure is proposed to solve the aforementioned problems, and an objective of the present disclosure is to provide a system and a method which can easily generate augmented reality contents through a simple process of operating a shooting button by using a simple image and video acquisition device such as a smart phone.

In addition, the present disclosure provides a system and a method in which, when a video is shot to generate augmented reality contents, a video before and after a shooting point of time can be automatically stored or time when a marker is stored can be variously selected, a resolution of the marker can increase, quality of the marker can be selected, and the maker can be easily generated by automatically extracting the marker through a general video file.

SUMMARY OF THE INVENTION

An exemplary embodiment of the present disclosure provides an augmented reality contents generation and play system including an image acquisition unit configured to include a preview mode in which an image which is input through a lens is displayed on a screen and a shooting mode in which, if an image to be shot is displayed in the preview mode, the image is captured by operating a shooting button and the captured image is converted into an image file; a storage unit configured to store an image which is obtained from the image acquisition unit when the shooting button is pressed and video information which is automatically obtained for a predetermined time based on a shooting point of time; a mapping unit configured to map the image which is stored in the storage unit onto a video which is stored in the storage unit; an augmented reality processing unit configured to recognize an image corresponding to a marker from the image which is obtained by the image acquisition unit, configured to call the video mapped onto the image, and configured to overlay the video on a position of the marker on a screen in the preview mode; and a control unit configured to control a process of generating and playing contents by using an augmented reality contents.

Another exemplary embodiment of the present disclosure provides an augmented reality contents generation and play system including an image acquisition unit configured to include a preview mode in which an image which is input through a lens is displayed on a screen and a shooting mode in which, if an image to be shot is displayed in the preview mode, the image is captured by operating a shooting button and the captured image is converted into an image file; a storage unit configured to automatically store a video file and the image file which are obtained by the image acquisition unit; a mapping unit configured to map the image which is stored in the storage unit onto a video which is stored in the storage unit; an augmented reality processing unit configured to recognize an image corresponding to a marker from the image which is obtained by the image acquisition unit, configured to call the video mapped onto the image, and configured to overlay the video on a position of the marker on a screen in a preview mode; and a control unit configured to control a process of generating and playing contents by using an augmented reality contents. The image acquisition unit automatically store an image (marker) when the shooting button is pressed or when the shooting button is released, if the video is stored when the shooting button is pressed and storage of the video ends when the shooting button is released, in the preview mode. The image is automatically obtained when the storage of a video starts or ends by using a method of starting the storage of a video starts when the shooting button is pressed and ending the storage of a video when the shooting button is pressed again, and the image is obtained by pressing the shooting button while the video is stored by using the method of starting the storage of a video starts when the shooting button is pressed and ending the storage of a video when the shooting button is pressed again.

Still another exemplary embodiment of the present disclosure provides an augmented reality contents generation and play method including shooting a video in a preview mode of the image acquisition unit; obtaining at least one image and video data by operating a shooting button if an image to be captured is displayed in a preview mode, assigning a unique key value to the data, storing the data, also automatically storing a video in a predetermined time zone before and after a shooting point of time, and obtaining a high resolution image among the captured images; mapping the stored image onto the video by using the mapping unit and storing mapping information; printing the captured image; recognizing a photo corresponding to a marker by using the marker detection unit if augmented reality application is executed, and calling a video mapped onto the recognized photo by transmitting a signal to the mapping unit; and playing the video by overlaying the called video on a position of the marker of the image display unit.

As described above, an augmented reality contents generation and play system and a method thereof have the following advantages. First, augmented reality contents are easily generated and played by a simple process of obtaining an image by a simple operation of operating the shooting button while a video is shot by pressing a shooting button of a popularized image acquisition device such as a smart phone, automatically storing a video for a predetermined time before and after a point of time when the shooting button is pressed, and mapping the video onto an image. Accordingly, an ordinary people easily generate the augmented reality contents by using only a smart phone without a complex device and procedure. Second, if a video is stored when the shooting button is pressed and storage of a video ends when the shooting button is released, an image (marker) can be automatically stored when the shooting button is pressed or when the shooting button is released, or the image can be automatically obtained when storage of a video starts or ends by using a method of starting the storage of a video by pressing the shooting button and ending the storage of a video by pressing the shooting button again, or the image can be obtained by pressing the shooting button when while the video is stored by using the method of starting the storage of a video by pressing the shooting button and ending the storage of a video by pressing the shooting button again. Thereby, the augmented reality contents can be easily generated. Third, in order to obtain a high resolution image, an image for a marker is automatically captured by multiple number of times or a predetermined number of times for an initial predetermined time, or the image for a marker is automatically captured by multiple number of times for a predetermined time before the shooting button is released, and an image with high quality is selected among one or more images. Accordingly, a resolution of the marker can increase and quality of the marker can be selected. Fourth, the augmented reality contents can be easily generated and played by automatically extracting the marker from a general video file.

DETAILED DESCRIPTION OF THE EMBODIMENTS

Figure 1:
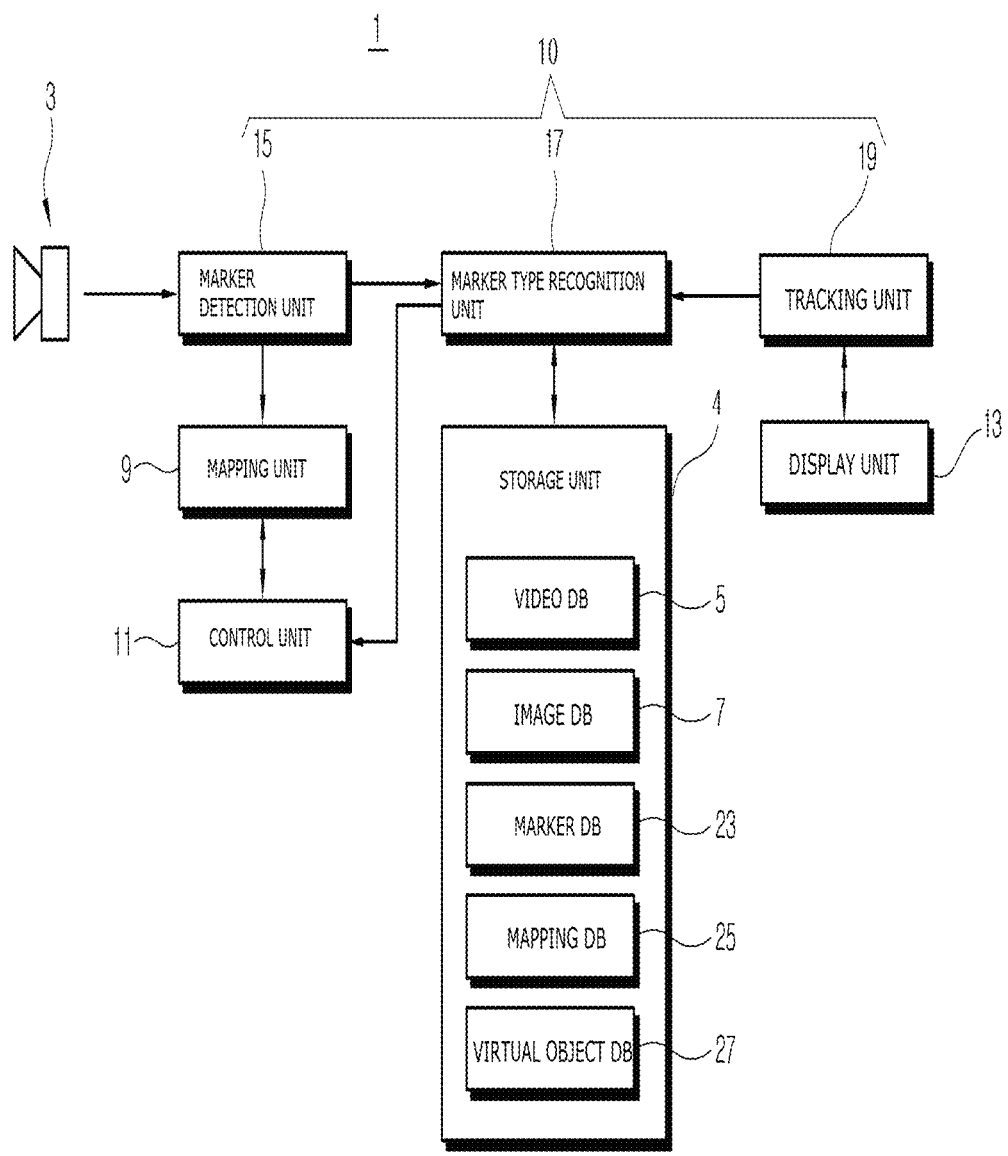
FIG. 1 schematically illustrates a configuration of an augmented reality contents generation and play system according to an embodiment of the present disclosure.
Figure 2:
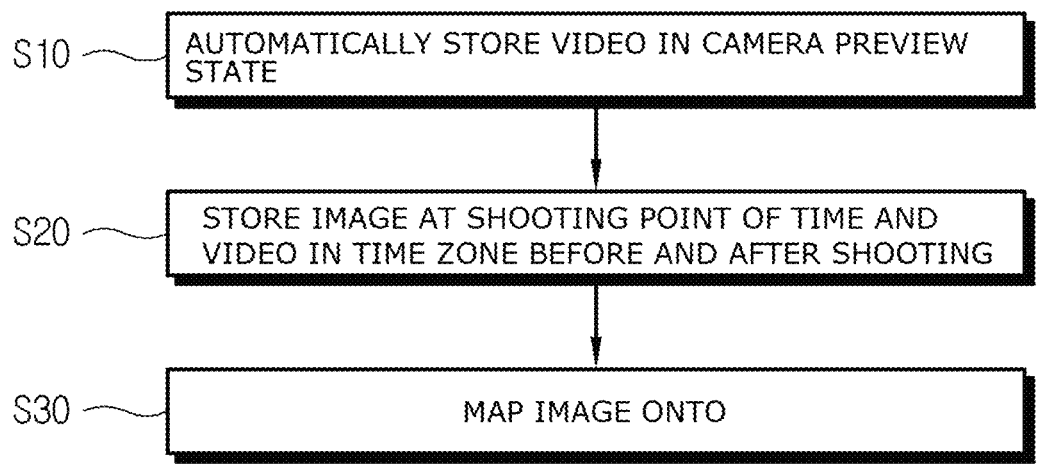
FIG. 2 is a flowchart illustrating a method of generating contents by using the augmented reality contents generation and play system illustrated in FIG. 1.

Hereinafter, an augmented reality contents generation and play system according to the present disclosure and a method which uses the system will be described in detail with reference to the accompanying drawings.

As illustrated in FIGS. 1 to 5, an augmented reality contents generation and play system 1 according to an embodiment of the present disclosure includes an image acquisition unit 3 which acquires an image and video information and displays the information on a screen, a storage unit 4 which separates the image obtained by the image acquisition unit 3 from the video information obtained for a predetermined time before and after image shooting time and automatically stores the image and the video information, a mapping unit 9 which maps the stored image onto the stored video, an augmented reality processing unit 10 which calls a video mapped onto a related image by recognizing an image relating to a marker from a image obtained through the image acquisition unit 3, and overlays the video at a marker position on a screen in a preview mode, and a control unit 11 which controls a process of generating and playing contents by using an augmented reality application.

In the augmented reality contents generation and play system 1 having the aforementioned configuration, the image acquisition unit 3 shoots a real environment including an actual object or marker and obtains an image on the real environment from the shot environment.

The image acquisition unit 3 may be a digital camera or a webcam which is connected to an external arithmetic device such as a computer, or a camera embedded in a mobile communication device such as a smart phone. In addition to this, the image acquisition unit 3 can include all of devices which can obtain image digital information, and such devices can be appropriately selected according to augmented reality contents.

The image acquisition unit 3 can realize a preview mode and a shooting mode. That is, in a preview mode, image data which is input through a camera lens is displayed through a display window of an LED or the like, a user can recognize a subject that a camera shoots for now. In addition, the image data which is obtained at the preview mode can be stored in the storage unit 4.

At this time, the preview mode includes not only a state where a video is simply displayed on a display, but also a state where a shape such as a square frame indicating a screen is displayed and a video is displayed in the square frame.

For example, a digital camera can capture an image even in a state where a video is simply displayed on the display, without the preview mode in which a screen is marked.

In addition, in a shooting mode, if an image to be captured is displayed while an image is displayed on a screen, data on a related image can be obtained by touching a shooting button.

Figure 4:
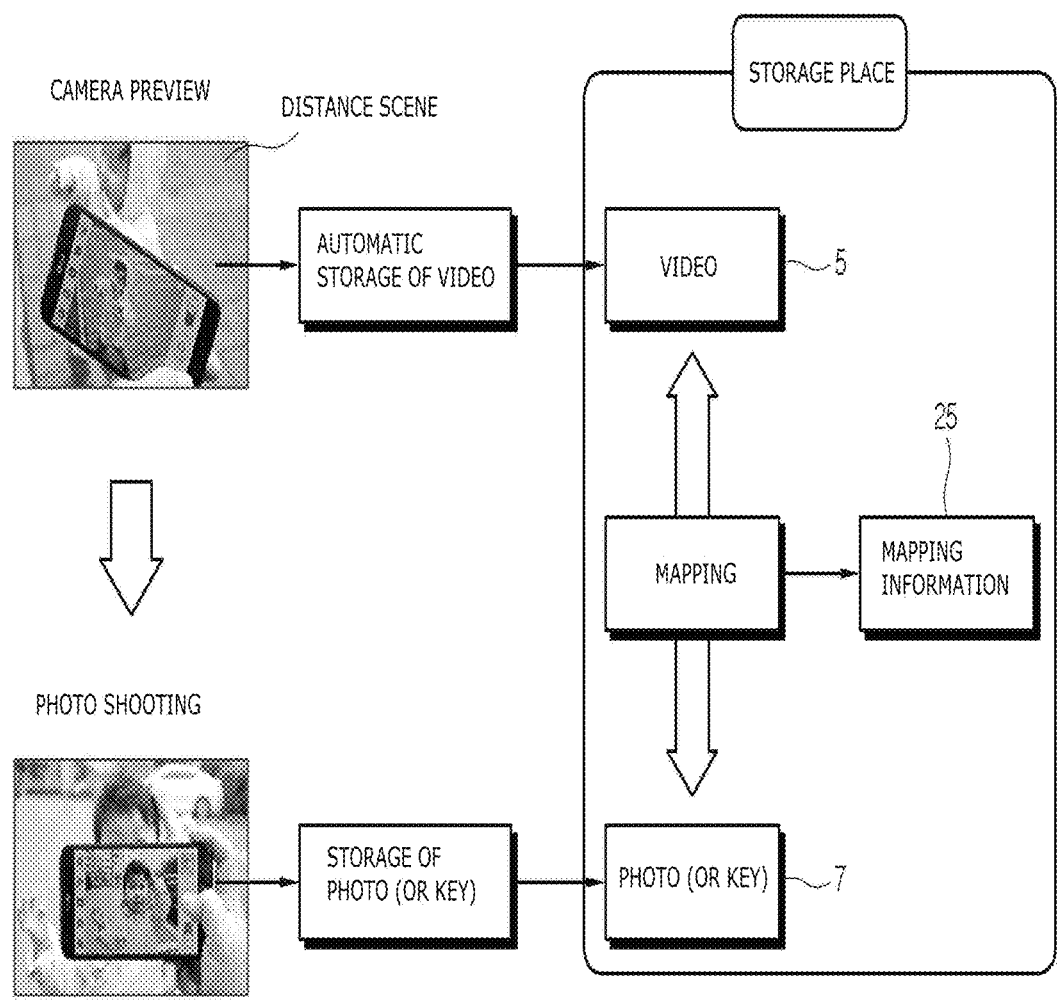
FIG. 4 is a diagram illustrating a process of actually generating contents by using the augmented reality contents generation and play system illustrated in FIG. 2.

For example, if a child is displayed on a screen in the preview mode of a smart phone while a street scene is shot, an image of the child is obtained by pressing the shooting button, as illustrated in FIG. 4.

At this time, the preview mode and the shooting mode can be selected by a user through the menu window or the like, and mode switching and an operation thereof can be performed by the control unit 11. Accordingly, while a video is stored in the preview mode, an image can be obtained by pressing the shooting button in the shooting mode, and the image and the video can be stored at the same time.

As such, the obtained image and video data can be respectively and automatically stored in an image storage unit 7 and a video storage unit 5.

At this time, the storage unit 4 includes a memory of a normal type such as a disk or a chip, and includes any type of media that can store digital information and electrically process the digital information. Hence, a memory of such type can store image and video data which are obtained by the image acquisition unit.

At this time, the storage unit 4 stores not only the image data and the video data but also a video before and after a shooting point of time.

Figure 5:
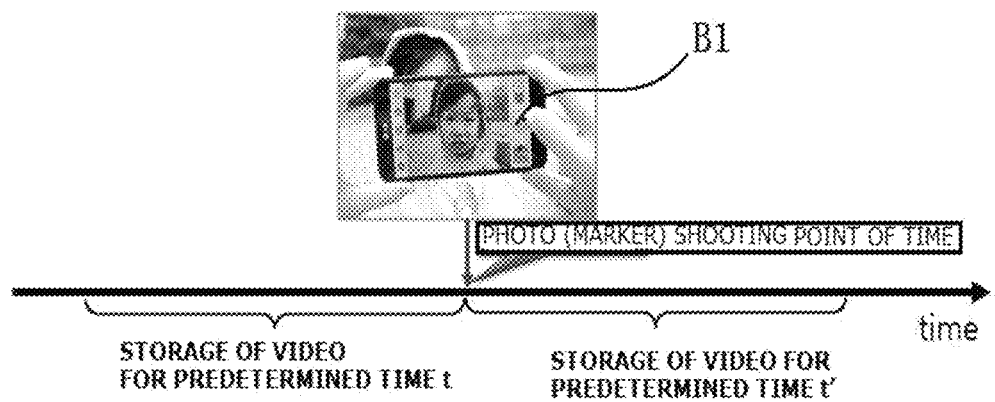
FIG. 5 schematically illustrates a process of automatically storing a video at a predetermined time zone before and after a shooting point of time, when an image is obtained by operating a shooting button.

That is, when a user operates a shooting button B1 to obtain an image, the control unit 11 performs control such that a video shot at a predetermined time zone before and after the shooting point of time is automatically stored in the storage unit 4, as illustrated in FIG. 5.

For example, if time to shoot a subject by pressing the shooting button is 12:00, a video shot in a time zone from 11:50 that is ten before 12:00 to 12:00, and a video shot in a time zone from 12:00 to 12:10 that is ten past 12:00, based on 12:00 can be automatically stored.

As a result, if the user presses the shooting button B1 by recognizing a target subject in a preview mode of a smart phone while the subject is shot, a photo at the shooting point of time can be obtained and a video at a predetermined time zone before and after the shooting point of time can also be automatically stored in the storage unit 4.

In addition, the video at the predetermined time zone before and after the shooting point of time can be stored by software such as an augmented reality application or a drive program installed in the image acquisition unit 3.

Figure 6:
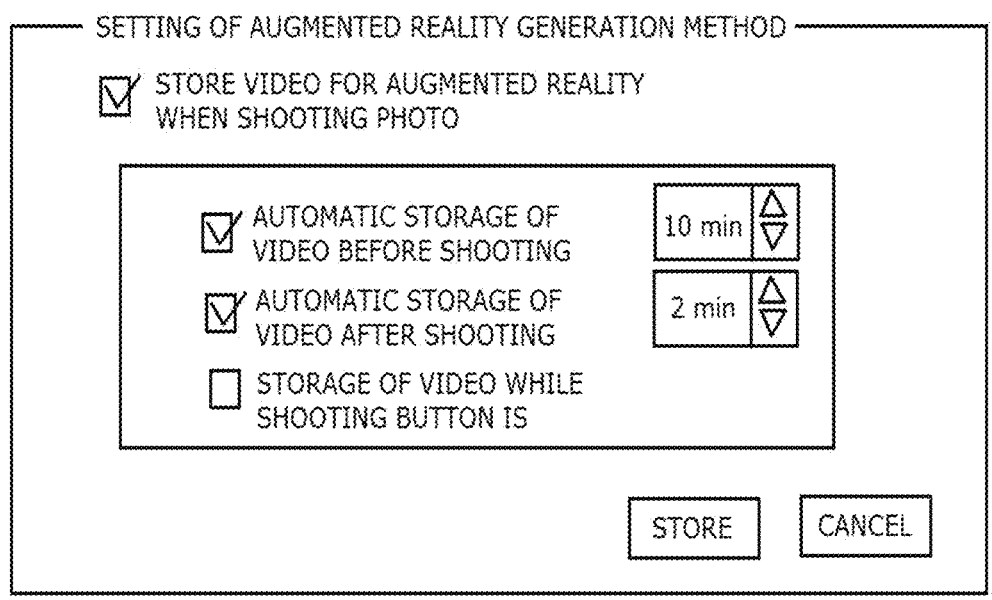
FIG. 6 illustrates a menu for setting a method of storing a video when shooting a video, as a menu window of an image acquisition unit illustrated in FIG. 1.

At this time, the time zone can be freely set on the menu window by a user, as illustrated in FIG. 6.

That is, automatic video storage time before shooting is set or automatic video storage time after shooting can be set by touching a time display window.

In addition, the present disclosure is not limited to a method of automatically storing a video for a predetermined time before and after a shooting point of time as described above, and a video can be stored by using other methods.

For example, a video can be automatically stored while the shooting button is pressed as shown in the menu window.

As such, a user can appropriately select whether an automatic storage condition of a video is before and after the shooting point of time or while the shooting button is pressed, depending on a work environment.

In addition, an image obtained by the shooting button is used for a marker, and thus, shooting points of time for obtaining an image can be variously set.

Figure 7:
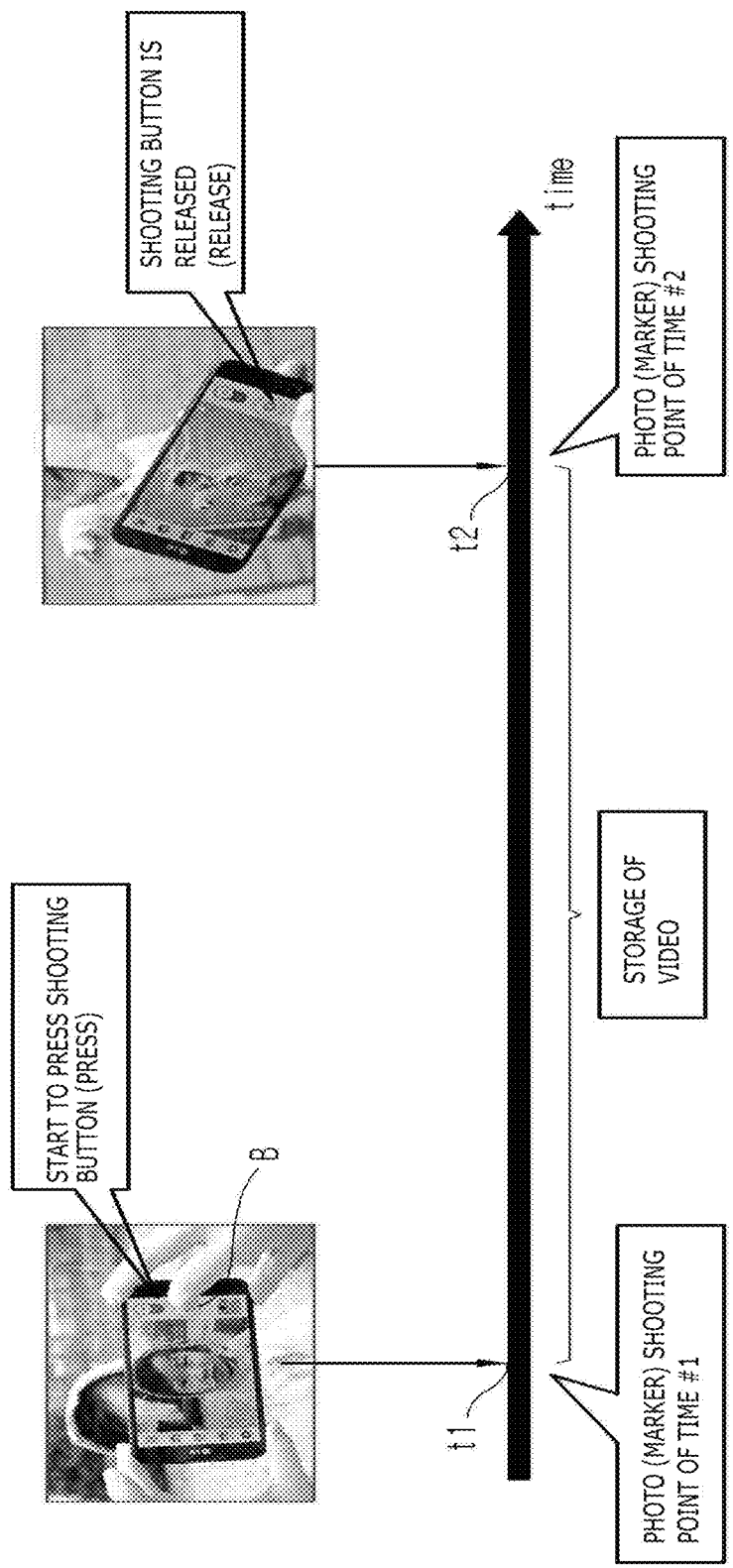
FIG. 7 schematically illustrates a process of automatically storing an image (marker), when a shooting button is pressed or when the shooting button is released, if a video is stored when the shooting button is pressed and storage of a video stops when the shooting button is released.

For example, if a video is stored when a shooting button B is pressed and storage of the video ends when the shooting button B is released, an image (marker) can be automatically stored when the shooting button B is pressed (t1) or when the shooting button B is released (t2), as illustrated in FIG. 7, and this can be selectively performed.

Figure 8:
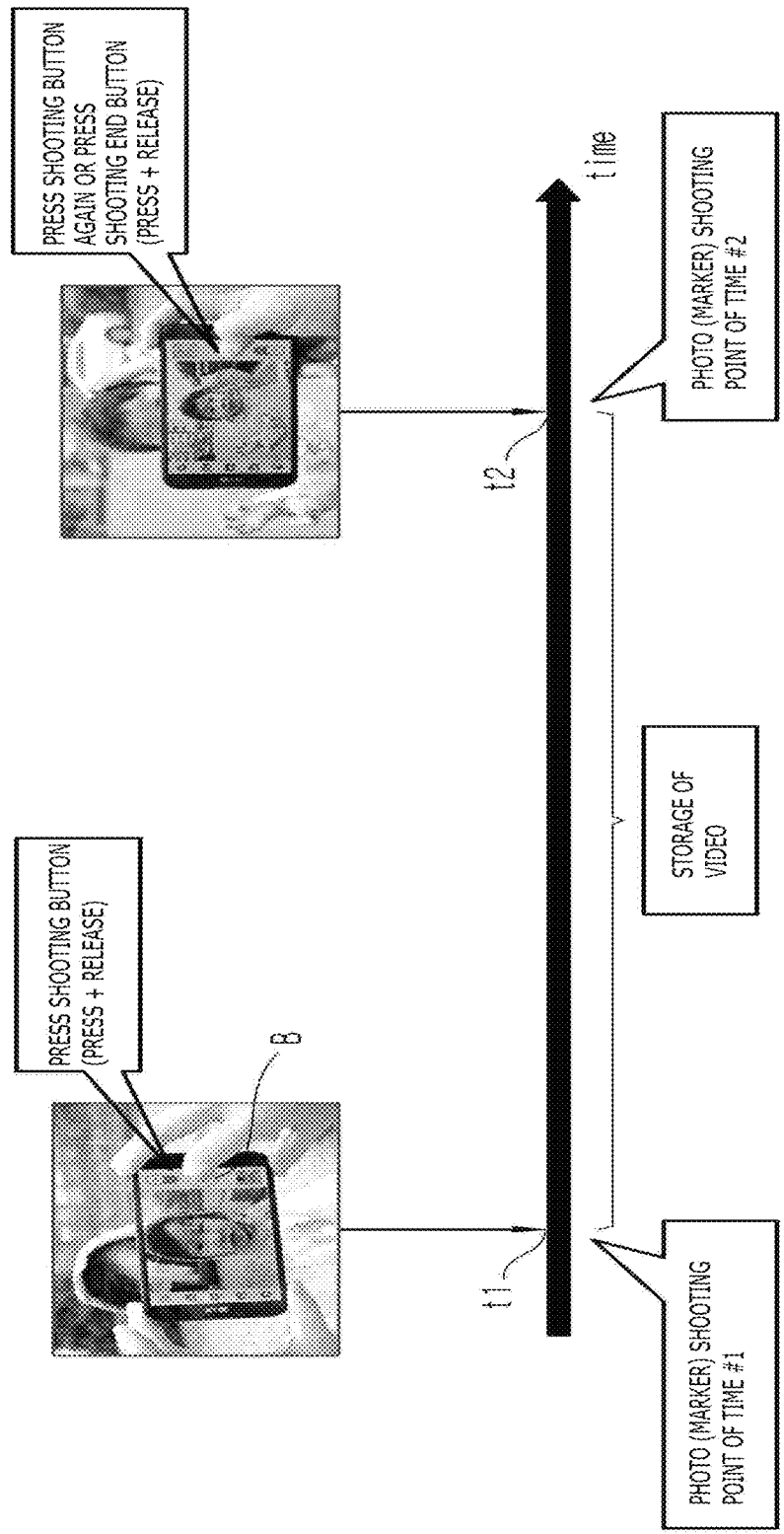
FIG. 8 schematically illustrates a process of automatically obtaining an image when storage of a video starts or ends, in a method of starting storage of a video by pressing the shooting button and ending the storage of a video by pressing the shooting button again.

Alternatively, when storage of a video starts (t1) or the storage of a video ends (t2), an image can be automatically obtained as a method of starting the storage of a video by pressing the shooting button B and ending the storage of a video by pressing the shooting button B again, as illustrated in FIG. 8, and this can be selectively performed.

Figure 9:
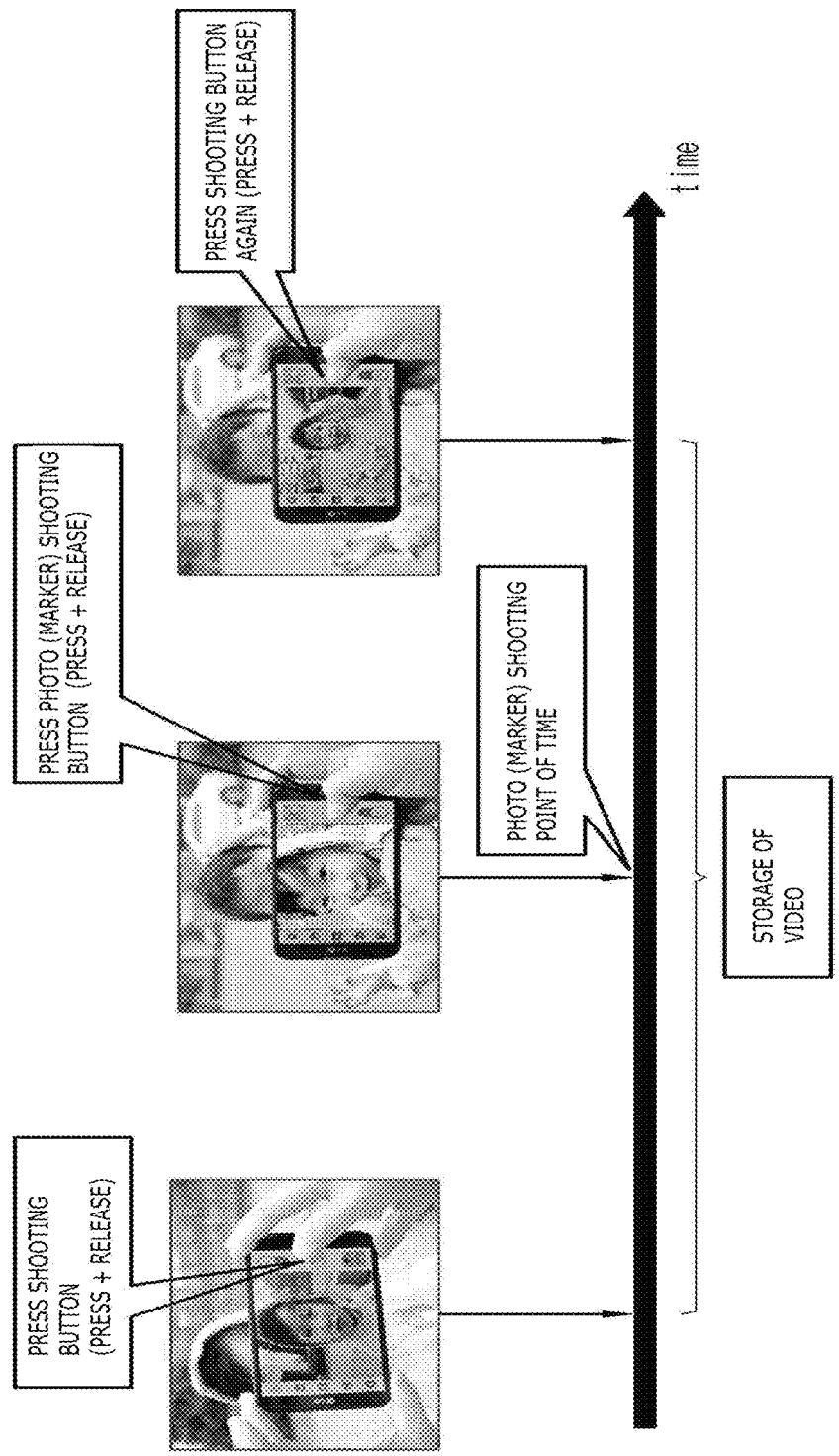
FIG. 9 schematically illustrates a process of obtaining an image by pressing the shooting button when a video is stored, in the method of starting the storage of a video by pressing the shooting button and ending the storage of a video by pressing the shooting button again.

Alternatively, an image can be obtained by pressing the shooting button B1 when a video is in the middle of storing, as a method of starting the storage of a video by pressing the shooting button B (t1) and ending the storage of a video by pressing the shooting button B again (t2), as illustrated in FIG. 9.

Figure 10:
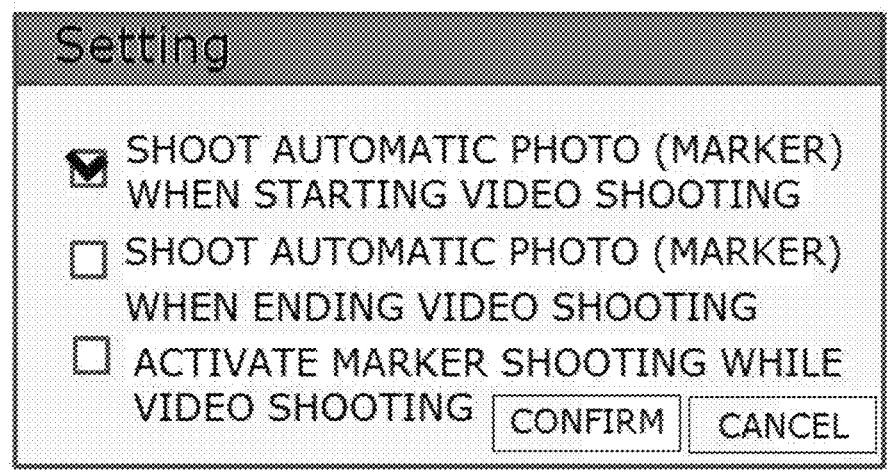
FIG. 10 illustrates a menu of a control panel UI.

As described above, a point of time when the shooting button for a video and an image is pressed can be variously changed, and this can be performed by selecting a related menu of the control panel UI illustrated in FIG. 10.

As described above, a user can pop a time setting menu on the menu window, and can appropriately set video storage time.

Referring to FIGS. 1 to 6 again, when the image and the video are stored, the control unit 11 provides a unique key value (Key) to each data by transmitting a signal to the mapping unit 9.

As such, by providing the key value, image information is converted into a Key value to be stored in DB information when a marker and video mapping information are stored in a DB, and thereby, DB search can be easily performed.

The mapping unit 9 means a normal mapping unit 9, and maps image data onto video data. That is, by connecting an image to a video corresponding to the image, when a specified image is designated, a video corresponding to the image is called and played.

In the present disclosure, the image data which is obtained at the shooting point of time is mapped onto the video data which is automatically stored at a predetermined time zone before and after the shooting point of time. Hence, if an image is designated at the shooting point of time, the video data before and after the shooting point of time is automatically called and is played.

The mapping unit 9 determines information which is required when an image is mapped onto a video. That is, information on related positions, related directions, and related sizes of the video and the image is required, and thus, coordinates can be set to the image and the video, and mapping information can be calculated and stored in accordance with the coordinates.

As such, as the image and the video are stored in a state of being mapped, augmented reality contents can be generated.

At this time, if the captured image has a small number of feature points, the image is printed to be used as a marker as will be describe below, and thus, when the image is captured by a marker detecting unit, if the feature points are small, detection performance may decrease.

Hence, in order to solve the problem, a pattern such as a barcode is added to a border of the captured image, and thus, feature points can be added.

In addition, the augmented reality contents can be played by the augmented reality processing unit 10. The augmented reality processing unit 10 includes a marker detection unit 15, a marker type recognition unit 17, a tracking unit 19, and a image display unit 13.

The marker detection unit 15 extracts a marker from an actual image recognized by the image acquisition unit 3, and detects the marker by comparing the extracted marker with feature point information of the marker stored in the storage unit 4.

At this time, various types of the marker can be used and, in the present embodiment, an image which is printed in a paper shape by a device such as a printer is used as the marker.

Such an image of a paper shape can be obtained by various methods, an image with high resolution and high quality can be obtained if shooting is performed in an image shooting mode state, but, in contrast to this, if an image for a marker is obtained in a video shooting mode, a relatively low resolution image is obtained.

That is, since a video is shot at the rate of 30 frames per second, the video generally has a low resolution, compared with an image.

Hence, if a marker is generated by obtaining an image while shooting a video, a resolution of the marker is low, and if the image is output in a paper shape, the image has a low resolution. Accordingly, it is difficult to use the image as a marker.

The present disclosure provides a method of being able to obtain a clean image even while shooting a video in consideration of such a point.

At this time, if a resolution of an image is set to be higher than a resolution of a video in relation to a method of storing the image, the captured image itself has to be stored, and if the resolution of the image is the same as the resolution of the video, a method can be used in which a related image is found by using a frame position later after only a video frame position is stored when an image shooting button is pressed, in addition to the method of storing the image itself.

As such, a method of obtaining a high resolution image will be described with reference to FIG. 11.

Figure 11:
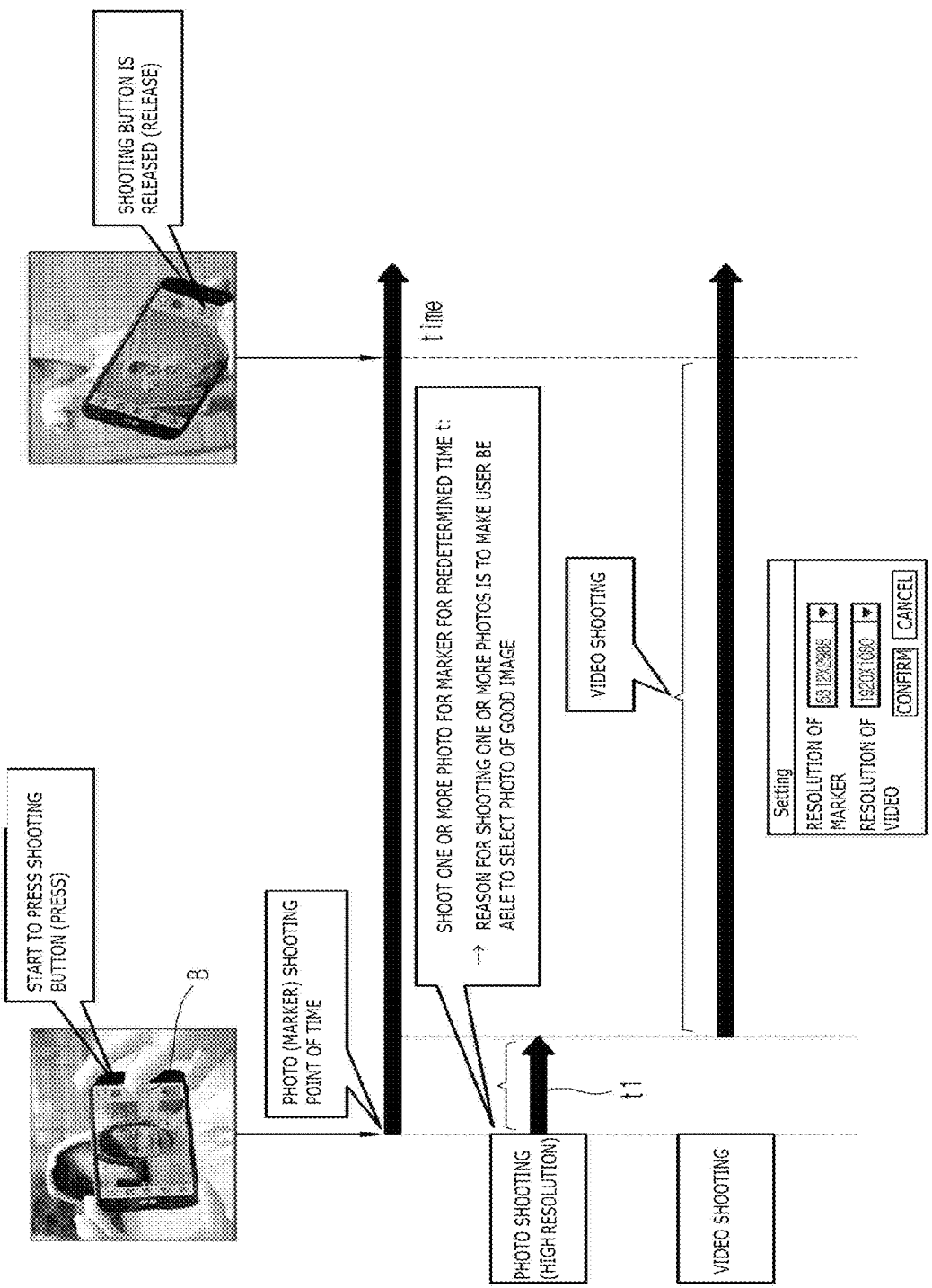
FIG. 11 illustrates a process of automatically capturing an image for a marker by multiple number of times for an initial predetermined time so as to obtain a high resolution image, if an image is generated when video shooting starts.

As illustrated in FIG. 11, if an image is generated when video shooting starts, an image for a marker is automatically captured by multiple times for a predetermined time so as to obtain a high resolution image.

That is, if the shooting button B is pressed, an image is automatically captured for an initial predetermined time (t1), and thereby, the image for a marker can be obtained. While the shooting button B is pressed, a video is automatically shot, and if the shooting button B is released, the video shooting ends.

At this time, one or more images for a marker can be captured during an initial predetermined time t1, and a user can select an image that he wants among the plurality of images in the process of selecting the marker later.

Figure 12:
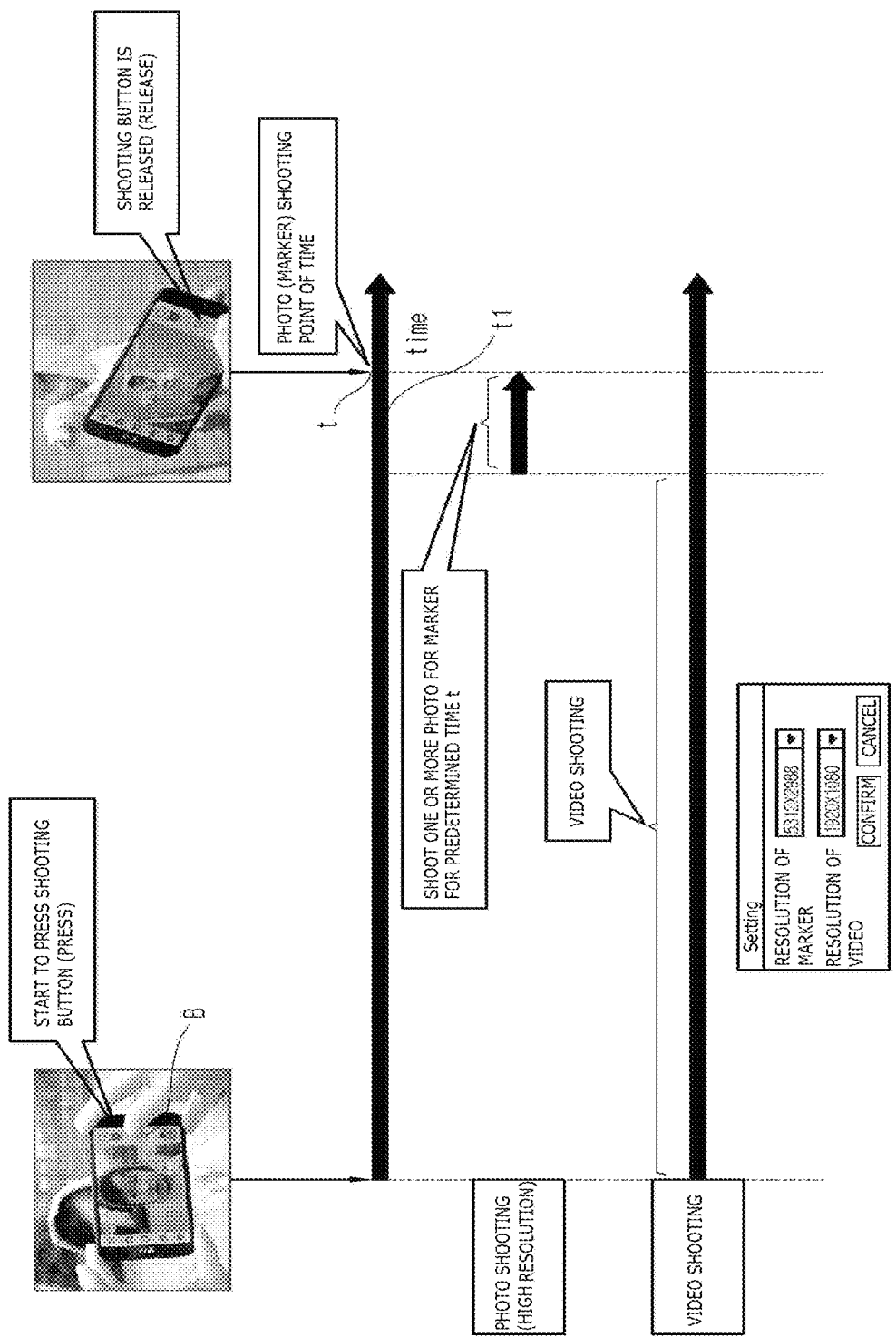
FIG. 12 illustrates a process of automatically capturing the images by multiple times for a marker for a predetermined time, before the shooting button is released so as to obtain the high resolution image if the image is generated when the video shooting starts.

In contrast to this, an image for a marker can be captured by multiple times for a predetermined time before the shooting button is released, as illustrated in FIG. 12.

That is, if the shooting button B is pressed, the video shooting starts and thereby the shooting is performed, and if the shooting button B is released to end the video shooting, the image for a marker can be automatically captured for a predetermined time (t1) before the shooting button B is released. At this time, one or more image for a marker are captured, and thereby, a user can select an image with high quality among the plurality of images in the process of selecting a marker later.

Figure 13:
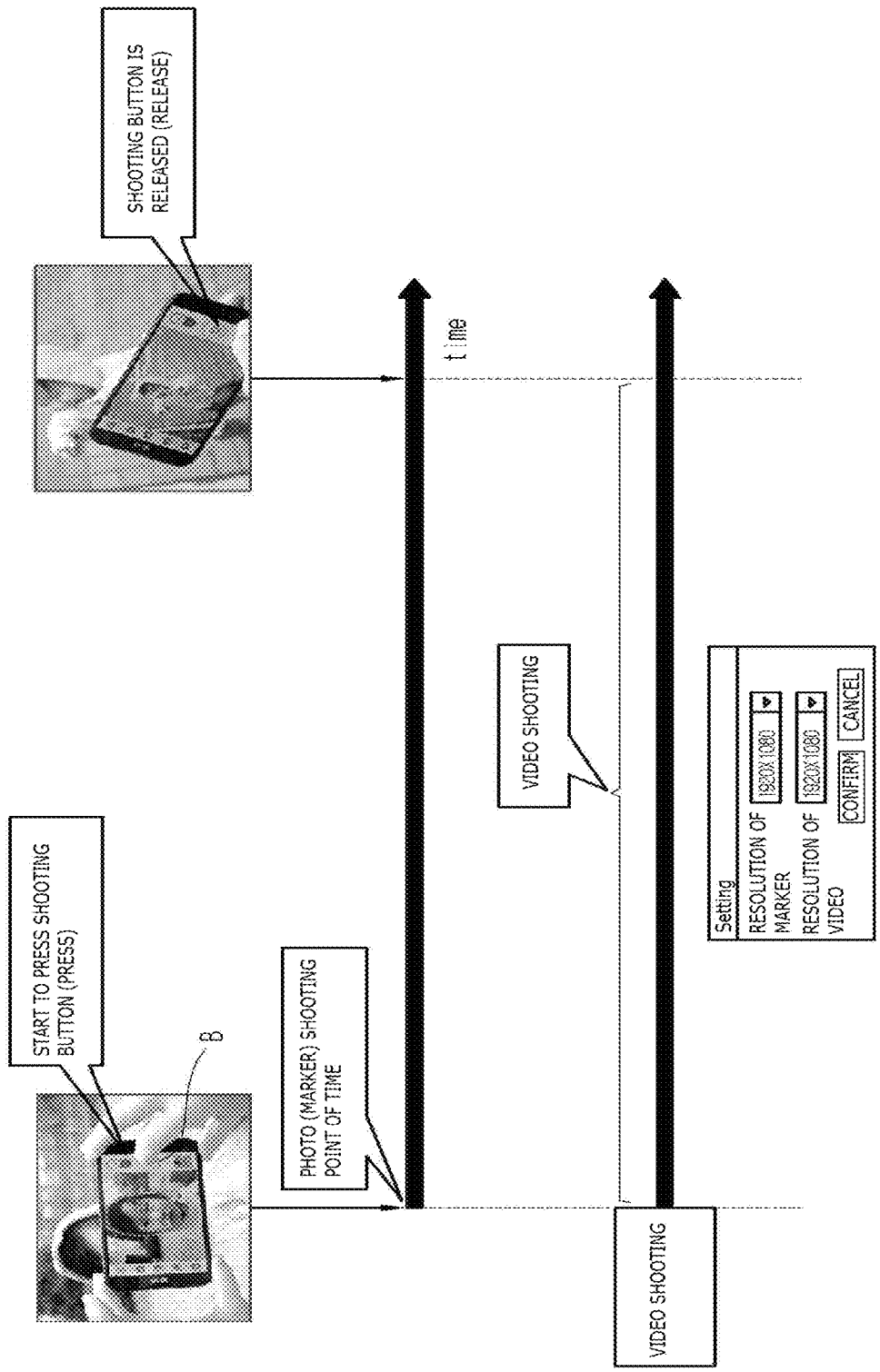
FIG. 13 illustrates a process of obtaining an image with the same resolution as a video, if the image is generated when video shooting starts.

In addition, FIG. 13 illustrates a case where an image has the same resolution as a video, if the image is generated when video shooting starts.

In this case, since a marker has the same resolution as the video, it is unnecessary to separately shoot a high resolution photo, but if the marker has higher resolution than the video, the photo shooting can be performed in the same manner as in the cases of FIG. 11 and FIG. 12 described above.

Figure 14:
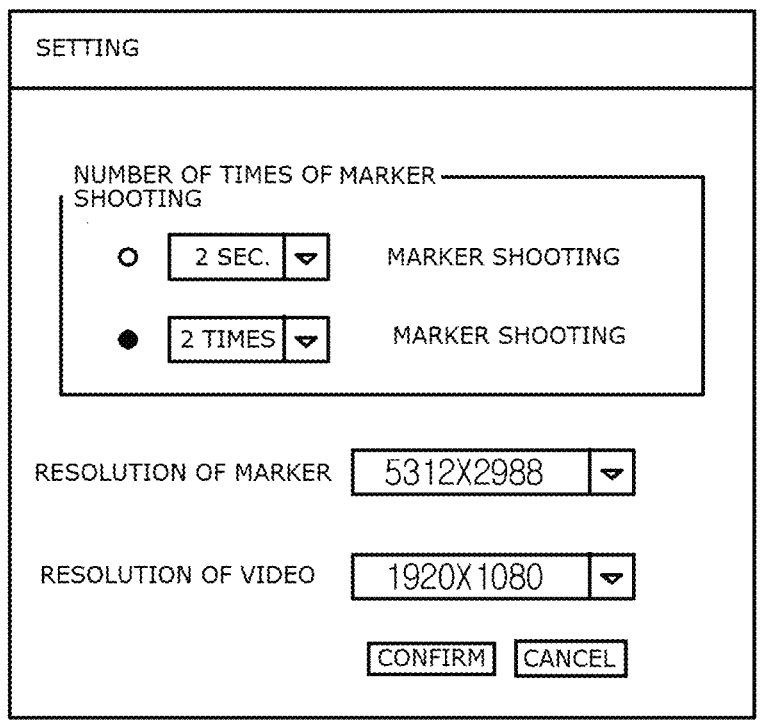
FIG. 14 illustrates the control panel UI for selecting a resolution of a video and a resolution of an image.

In addition, the resolution of the video and the resolution of the image can be arbitrarily set by a menu (UI) which is displayed on a control panel as illustrated in FIG. 14.

In addition, a plurality of images can be set to be captured automatically and arbitrarily, or a predetermined number of images can be set to be captured.

Figure 15:
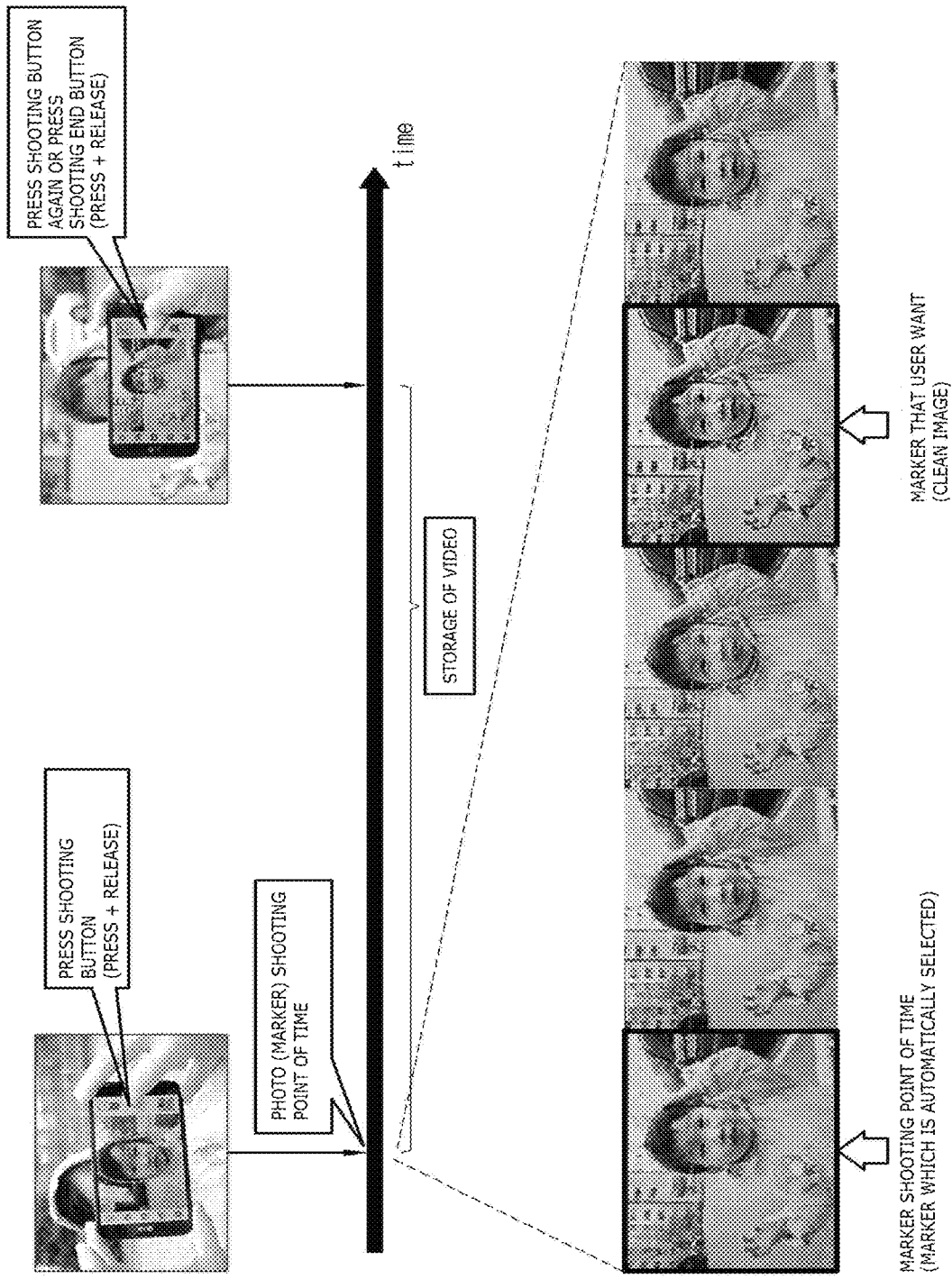
FIG. 15 illustrates a process of preventing a hassle of shooting a video again because all the plurality of images for a marker or a part of the images is degraded if quality of the video is low.

Meanwhile, if the image for a marker is captured for an initial predetermined time while shooting a video, for a predetermined time thereafter, or at the same time as video shooting as described above, all of the plurality of images for a marker or a part of the images has low quality and thereby the video is shot again, if quality of the video is low as illustrated in FIG. 15.

In this case, as illustrated in FIG. 14, a UI is provided such that an image that a user wants among a plurality of the captured images is selected.

That is, the user can select an image with high quality that he wants because a captured screen among a plurality of images displayed on a screen may be out of focus thereby being blurry.

Figure 17:
FIG. 17 illustrates a process of selecting a desired image among images which are displayed by pressing a video play button to select a high quality image.

Alternatively, as illustrated in FIG. 17, a desired image can also be selected in the image which is displayed by pressing a video play button. At this time, software can appropriately process that a video which is continuously played is displayed on a lower window of a screen as a plurality of still images if dragging is performed on one side in a state where the video play button is pressed.

Hence, a user can select an image that he wants among the plurality of images which are displayed on the lower window of the screen.

In addition, the images for a marker can also be generated from a general video file. That is, the image for a marker is not obtained by using a video file obtained by the augmented reality contents generation device that the present disclosure proposes, a specific frame of a known general video which is shot can also be generated as the image for a marker.

Figure 18:
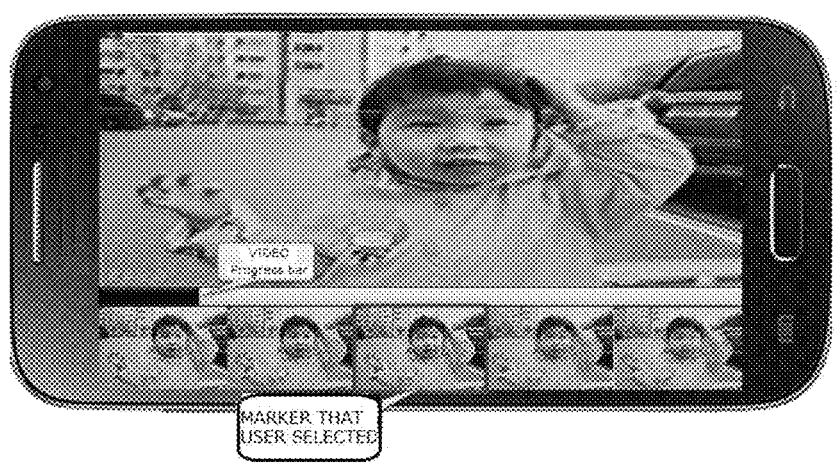
FIG. 18 illustrates a process of selecting an appropriate image among a plurality of still images while a general video is played.

A process of generating image for a marker is similar to the aforementioned process. That is, as illustrated in FIG. 18, a general video is played by pressing the video play button, and, if dragging is performed on one side in a state where the video play button is pressed, an image which is continuously played is displayed on a lower window of a screen as a plurality of still images, and an appropriate image can be selected among the plurality of images displayed on the lower window.

Meanwhile, a case where an image is output in a paper shape is described above, but the present disclosure is not limited to this, and the image can also operate as a marker by being marked on a display screen such as an LCD, without being output in the paper shape by an external output device.

Hence, if a printed image is detected among the images which are recognized by the image acquisition unit 3, the marker detection unit 15 compares the printed image with features of a marker stored in the storage unit 4, thereby, confirming that the printed image is a marker.

The marker can be realized in various forms in addition to the printed image form, and includes not only a unique identification marker, such as a barcode, which forms a geometric design or a constant pattern with a border in which black and white lines are printed, but also a nature feature point which uses a feature point of an actual object.

In addition, the marker detection unit 15 can detect a marker by using various methods, and can detect the marker by using, for example, color information of an actual object, segment information, edge information, or the like.

In addition, the marker type recognition unit 17 recognizes a marker by extracting a type (ID) of the marker which matches marker information stored in the storage unit 4 from marker information detected by the marker detection unit 15.

In addition, the tracking unit 19 traces slopes, directions, and distances of each marker detected by the marker detection unit 15.

At this time, the tracking unit 19 can recognize a slope from a shape of the marker, and shapes of each marker are defined according to various slopes in advance to be stored in the storage unit 4.

Hence, a photo obtained at the time of shooting is used as a marker, and a video which is mapped and called by tracking information on a slope, a direction, and a distance of the photo can also be played according to a slope, a direction, and a distance of the photo.

In addition, the image display unit 13 overlays the video obtained by the marker detection unit 15, the marker type recognition unit 17, and the tracking unit 19 on a photo (marker) marked on a screen.

Figure 20:
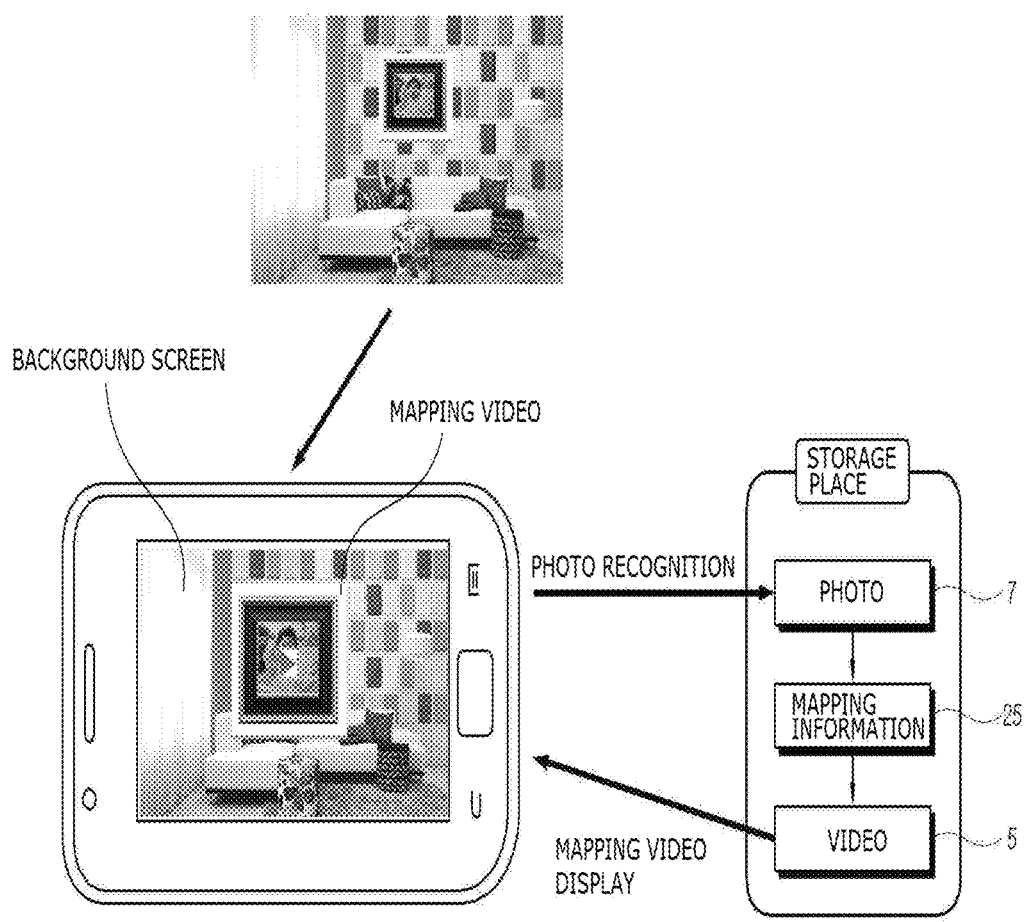
FIG. 20 illustrates a process of playing actual contents by using the augmented reality contents generation and play system.

For example, as illustrated in FIG. 20, if a photo on a wall is recognized in the middle of shooting the wall by using a smart phone, the photo is recognized as a marker, and a video mapped onto the photo is called. In addition, the called video can be overlaid on a position of a photo in a screen of the smart phone by the image display unit 13.

As a result, a mapped video is separately played at a position of the photo while the wall is displayed as a background on the screen of the smart phone, and thereby, an environment such as augmented reality can be realized.

Meanwhile, a process of generating and playing augmented reality contents can be performed by the control unit 11, as described above.

Figure 3:
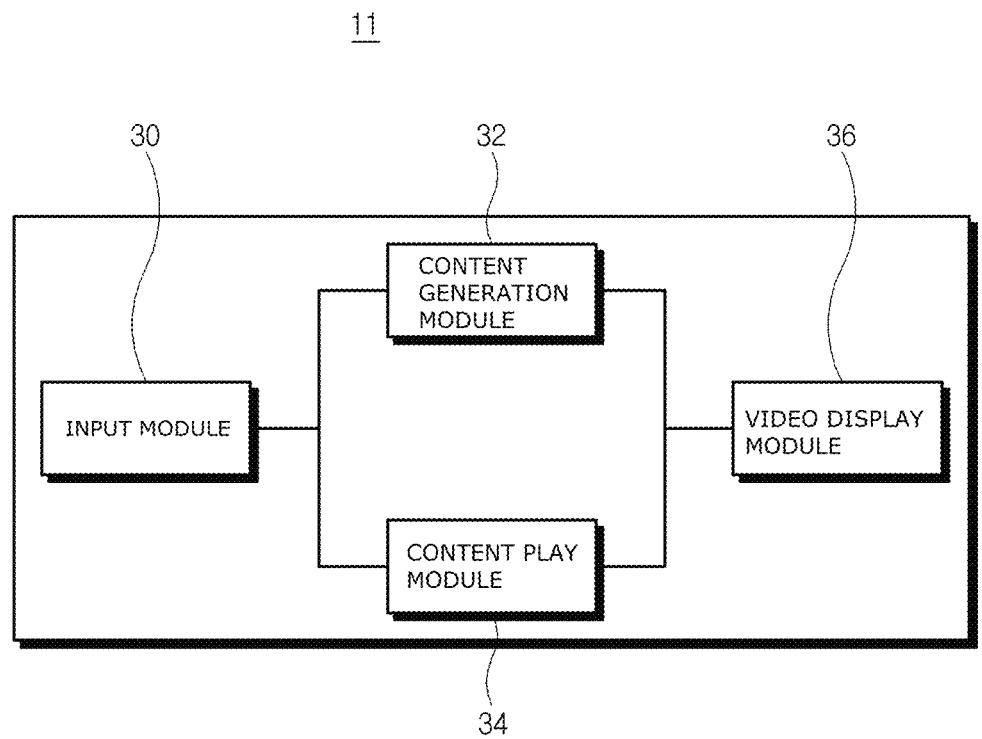
FIG. 3 is a block diagram schematically illustrating a configuration of a control unit illustrated in FIG. 1.

As illustrated in FIG. 3, the control unit 11 includes an input module 30 to which a shooting button signal is input, a contents generation module 32 which sets a key value to a captured image and a video associated with the captured image and stores the image and video in the storage unit 4 by outputting a signal to the storage unit 4 and the mapping unit 9 if a signal is input from the input module 30, a contents play module 34 which recognizes an image corresponding to the marker through the marker detection unit 15 if an augmented reality application is performed, and calls a video mapped onto a photo which is recognized by transmitting a signal to the mapping unit 9, and a image display module 36 which displays a video by overlaying the called video on a position of the marker of the image display unit 13.

In more detail, a signal which is generated when a shooting button of a smart phone or the like operates is transmitted to the input module 30.

In addition, if a shooting button operation signal is input from the input module 30, the contents generation module 32 outputs a signal to the storage unit 4 and the mapping unit 9. Hence, the contents generation module 32 controls information such that digital information on an image obtained by shooting and digital information on a video associated with the image are automatically stored in the storage unit 4. At this time, a unique key value by which an image can be identified is assigned to image information.

In addition, if a user inputs storage time through a menu, the contents generation module 32 stores the video in a time zone before and after time which is input based on shooting time.

In addition, the contents generation module 32 stores images in another storage unit 4 in a state where the image in a shooting point of time and the video image in the time zone before and after the shooting point of time are separated from each other and the unique key value is assigned to the images.

Alternatively, the contents generation module 32 assigns the unique key value to each of a plurality of images for a marker obtained through another menu and stores the images.

That is, as illustrated in FIG. 10, a UI setting screen includes three sets of automatic photo (marker) shooting when video shooting starts, automatic photo shooting when video shooting ends, and marker shooting activation while video is shot.

In addition, if one of the three sets of the menu is selected, the image for a marker can be obtained through the processes illustrated in FIGS. 7 to 9, a unique key value is assigned to each image, and the images are stored.

Alternatively, the contents generation module 32 assigns the unique key values to the plurality of high resolution images for a marker obtained from the image acquisition unit and stores the images.

That is, as illustrated in FIG. 11, if an image is generated when video shooting starts, unique key values are assigned to a plurality of images obtained by automatically capturing an image for a marker a plurality of times for an initial predetermined time so as to obtain a high resolution image.

Alternatively, as illustrated in FIG. 12, if an image is generated when the video shooting starts, unique key values are assigned to a plurality of images obtained by automatically capturing an image for a marker a plurality of times for a predetermined time before the shooting button is released so as to obtain a high resolution image.

Figure 16:
FIG. 16 illustrates a UI displayed on a screen such that an image, which a user wants, of a plurality of images can be selected.

Alternatively, as illustrated in FIGS. 16 and 17, the contents generation module 32 can also assign a unique key value to each of a video and an image which are shot to have the same resolution and store the video and the image.

Alternatively, as illustrated in FIG. 18, a unique key value can also be assigned to an image for a marker which uses a specific frame obtained from a general video and the image can be stored.

As such, if the augmented reality contents are generated, the control unit 11 performs an operation of generating the augmented reality contents through the contents play module 34.

That is, the contents play module 34 first executes an augmented reality application which are installed. In a state where the augmented reality application is executed, if an image on a real environment is recognized by the image acquisition unit 3, the marker detection unit 15 detects an image corresponding to a marker. In addition, if the corresponding image is detected, the marker detection unit 15 transmits a signal to the mapping unit 9 and calls a video mapped onto the recognized photo.

As such, if the mapped video is called, the image display module 36 plays the video by overlaying the called video on a position of a marker of the image display unit 13.

Meanwhile, the storage unit 4 includes an image DB 7 which stores image information, a video DB 5 which stores video information, a mapping DB 25 which stores mapping information, a marker DB 23 which stores information on a plurality of markers to be recognized, and a virtual object DB 27 which stores information on a virtual object which is mapped onto a marker stored in the marker DB.

Hereinafter, a method of generating and playing contents by using an augmented reality system according to one embodiment of the present disclosure will be described in more detail.

As illustrated in FIGS. 1, 2, 4, and 20, the method of generating and playing augmented reality contents includes a first step S10 of capturing an image in a preview mode of the image acquisition unit 3; a second step S20 of shooting a video and a related image if a shooting button operates, setting a key value, and stores the video and the image; a third step S30 of mapping the stored image onto the video by using the mapping unit 9, and storing mapping information; a fourth step S40 of printing the captured image; a fifth step S50 of recognizing a photo corresponding to a marker by using the marker detection unit 15 if augmented reality application is executed, and calling a video mapped onto the recognized photo by transmitting a signal to the mapping unit 9; and a sixth step S60 of playing the video by overlaying the called video on a position of the marker of the image display unit 13.

In more detail, in the first step S10, a subject is shot and thereby an image is obtained in a state where a system 1 is set to a preview mode. In addition, the obtained image data is continuously stored in the storage unit 4.

For example, if a user shoots an apartment complex in a state where a camera of a smart phone is set to a preview mode, the captured image data can be stored in the storage unit 4.

As such, if the first step S10 is completed, the second step S20 starts.

In the second step S20, if the user tries to shoot the subject, image data is obtained by touching a shooting button of the system 1.

For example, a child is displayed on a screen while a street scene is shot by using the smart phone, an image of the child is obtained by pressing the shooting button, as illustrated in FIG. 4.

In addition, the control unit 11 senses an operation signal of the shooting button, and stores data which is obtained at a shooting point of time in the storage unit 4. At this time, a unique key value is assigned to the image data.

In addition, video data at a predetermined time before and after the shooting point of time can be stored.

For example, if time to shoot a subject by pressing the shooting button is 12:00, a video shot in a time zone from 11:50 that is ten before 12:00 to 12:00, and a video shot in a time zone from 12:00 to 12:10 that is ten past 12:00, based on 12:00 can be automatically stored.

As described above, the present disclosure is not limited to a method of obtaining augmented reality contents by using an image at the time of shooting and a video in a predetermined time zone before and after shooting, and can be performed in various types.

For example, if a video is stored when the shooting button B is pressed (t1) and storage of the video ends when the shooting button B is released (t2), when the shooting button B is pressed (t1) or the shooting button B is released (t2), an image (marker) can be automatically stored and thereby contents can be obtained, as illustrated in FIG. 7.

Alternatively, according to a method of starting storage of a video by pressing the shooting button B and ending the storage of a video by pressing the shooting button B again, when the storage of a video starts (t1) or ends (t2), an image can be automatically stored and thereby contents can be obtained, as illustrated in FIG. 8.

Alternatively, according to a method of starting the storage of a video by pressing the shooting button B (t1) and ending the storage of a video when the shooting button B is pressed again (t2), an image can be stored by pressing the shooting button B when the video is stored, and thereby, contents can be obtained.

Meanwhile, a step of obtaining a higher resolution image file can be additionally performed in the second step.

That is, in a step of obtaining a higher resolution file, an image for a marker can be obtained by automatically capturing an image during an initial predetermined time t1 if the shooting button B is pressed, and a video is automatically shot while the shooting button B is pressed, and if the shooting button B released, the video shooting ends, as illustrated in FIG. 11. At this time, one or more images for a marker can be captured for an initial predetermined time t1, and an image with high quality can be selected among the plurality of images.

As such, after the second step is completed, the third step S30 of mapping an image onto a video is performed.

That is, the control unit 11 transmits a signal to the mapping unit 9, and thereby, the image is mapped onto the video. In addition, mapping information can be stored in a mapping database.

As such, in the process of playing contents of the first to third steps S10, S20, and S30, while a user performs shooting in a preview mode, a video and an image are obtained, the image and the video are mapped onto each other and stored, and thereby, it is possible to easily generate augmented reality contents.

Meanwhile, the augmented reality contents which are generated can be played in the following sequence.

Figure 19:
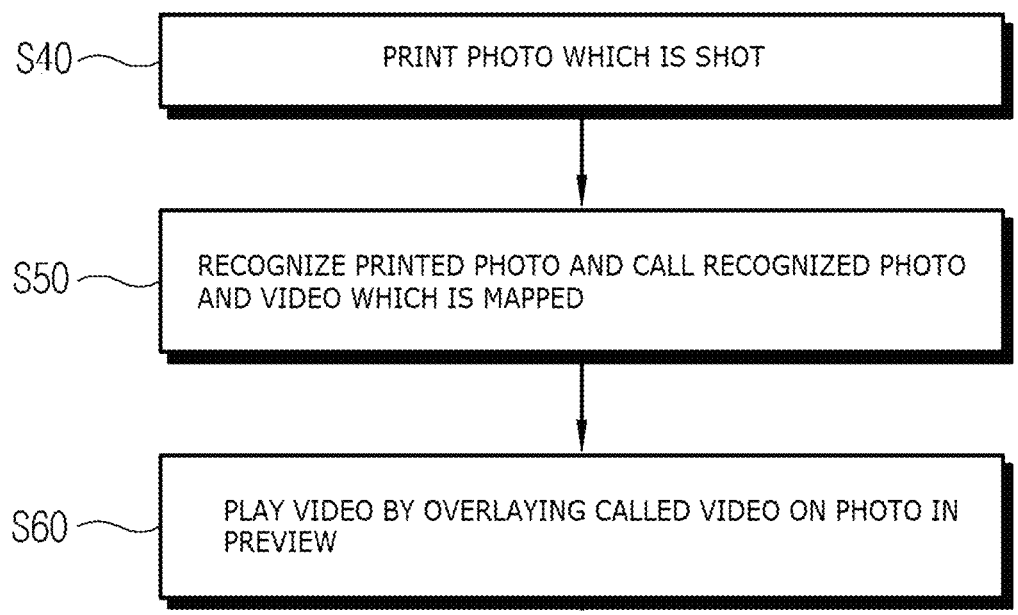
FIG. 19 is a flowchart illustrating a method of playing contents generated by the augmented reality contents generation and play system illustrated in FIG. 1.

First, the fourth step S40 is performed and a user selects an appropriate image among the captured images, as illustrated in FIG. 19. That is, the user pops up the images stored in an image database by touching a screen of a smart phone, touches an appropriate image, and selects the image.

In addition, the selected image is printed in a paper shape by an external output device such as a printer. That is, the image of the paper shape is used as a marker.

Of course, the image can also be displayed on a screen in a state of being popped up, without being output in the paper shape by the external output device.

Alternatively, a virtual object other than the image can also be used as a marker. For example, a virtual object in which black and white lines are printed in a border thereof or a pattern such as a barcode is printed can also be used.

As such, the fourth step in which an image is printed as a photo is completed, the fifth step S50 starts.

In the fifth step S50, if the augmented reality application is executed, a mode is switched to the preview mode, and thereby, an image of an area which is shot by a lens is displayed on a screen.

At this time, the marker detection unit 15 detects a marker from image data. That is, the marker detection unit 15 compares feature point information such as a pixel or the like of a photo printed on paper with data stored in the database. In addition, the marker detection unit 15 calls a video which is mapped onto the photo.

At this time, the tracking unit 19 recognizes a slope, a direction, and a distance of the photo by tracking the detected photo.

As such, if the fifth step S50 is completed, the sixth step S60 of playing a video starts.

That is, if an image (marker) is detected in a state of the preview mode while a background is displayed, a video which is mapped onto a position of the image is played, and thereby, a user can enjoy the augmented reality contents.

For example, if a photo on a wall is recognized while a smart phone shoots the wall, the photo is recognized as a marker, and a video which is mapped onto the photo is called, as illustrated in FIG. the heating unit 20. In addition, the called video can be overlaid on a position of the photo on a screen of the smart phone by the image display unit 13.

Meanwhile, in the aforementioned embodiment, the augmented reality contents are generated by automatically storing a video before and after photo shooting, but the present disclosure is not limited to this, and the augmented reality contents can also be generated by using a known video as follows.

Figure 21:
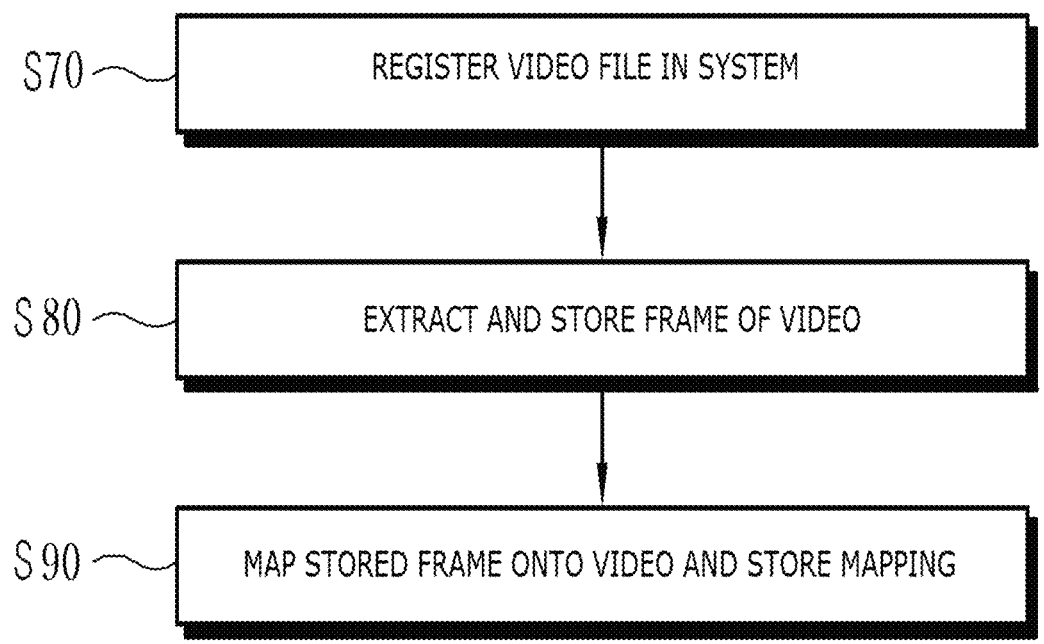
FIG. 21 is a flowchart illustrating a method of generating augmented reality contents from a video, according to another embodiment of the present disclosure.
Figure 22:
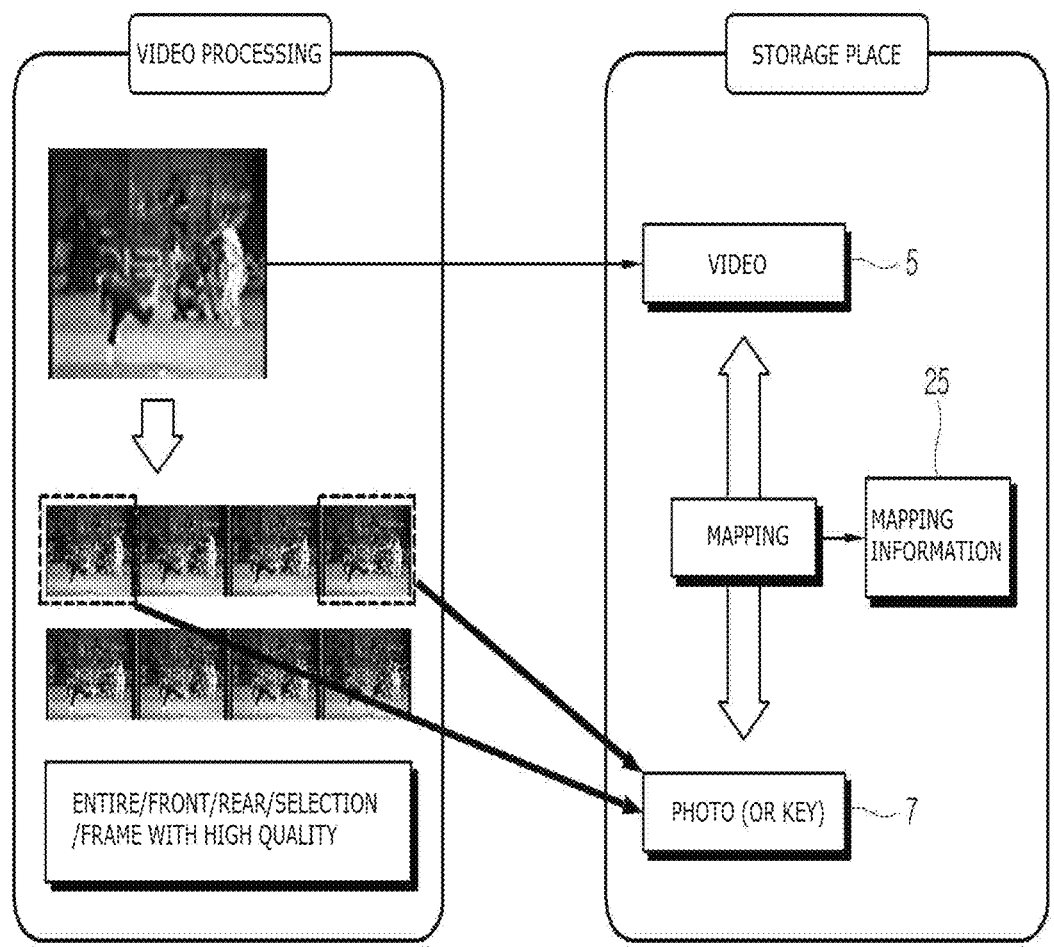
FIG. 22 illustrates a process of generating contents by using the augmented reality contents generation and play method illustrated in FIG. 21.

That is, a video file is stored in the system 1, as illustrated in FIGS. 21 and 22. In addition, the video file is played on a screen by executing an application.

While a video is played, a frame to be used as a marker is selected and designated (S80). That is, by capturing a specific frame of a video which is played on the screen, a related frame is stored in an image file form.

At this time, a frame which is in an arbitrary position of the entire video can be selected as the captured frame.

As such, by assigning a key value to the captured image file, a virtual object is mapped onto a related video, and thereby, the augmented reality contents can be generated (S90). In addition, the generated information can be stored.

INDUSTRIAL APPLICABILITY

The present disclosure relates to a technology of easily generating or playing augmented reality contents by using a simple method of automatically storing a video for a predetermined time before and after video shooting or a marker while a video is shot by using only a mobile communication device such as a smart phone, and can be widely used in a technical field relating to augmented reality.

What is claimed is:

1. An augmented reality contents generation and play system comprising:
   an image acquisition unit configured to include a preview mode in which an image which is input through a lens is displayed on a screen and a shooting mode in which, if an image to be shot is displayed in the preview mode, the image is captured by operating a shooting button and the captured image is converted into an image file;

a storage unit configured to store an image which is obtained from the image acquisition unit when the shooting button is pressed and video information which is automatically obtained for a predetermined time based on a shooting point of time;

a mapping unit configured to map the image which is stored in the storage unit onto a video which is stored in the storage unit;

an augmented reality processing unit configured to recognize an image corresponding to a marker from the image which is obtained by the image acquisition unit, configured to call the video mapped onto the image, and configured to overlay the video on a position of the marker on a screen in the preview mode; and a control unit configured to control a process of generating and playing contents by using an augmented reality contents.

2. An augmented reality contents generation and play system comprising:

an image acquisition unit configured to include a preview mode in which an image which is input through a lens is displayed on a screen and a shooting mode in which, if an image to be shot is displayed in the preview mode, the image is captured by operating a shooting button and the captured image is converted into an image file;

a storage unit configured to automatically store a video file and the image file which are obtained by the image acquisition unit;

a mapping unit configured to map the image which is stored in the storage unit onto a video which is stored in the storage unit;

an augmented reality processing unit configured to recognize an image corresponding to a marker from the image which is obtained by the image acquisition unit, configured to call the video mapped onto the image, and configured to overlay the video on a position of the marker on a screen in a preview mode; and a control unit configured to control a process of generating and playing contents by using an augmented reality contents, wherein the image acquisition unit automatically store an image (marker) when the shooting button is pressed or when the shooting button is released, if the video is stored when the shooting button is pressed and storage of the video ends when the shooting button is released, in the preview mode, and wherein the image is automatically obtained when the storage of a video starts or ends by using a method of starting the storage of a video starts when the shooting button is pressed and ending the storage of a video when the shooting button is pressed again, and the image is obtained by pressing the shooting button while the video is stored by using the method of starting the storage of a video starts when the shooting button is pressed and ending the storage of a video when the shooting button is pressed again.

3. The augmented reality contents generation and play system according to claim 2, wherein, if the image acquisition unit obtains a high resolution image for a marker, a plurality of or a predetermined number of images are automatically captured for initial predetermined time if the shooting button is pressed, and the video is automatically shot while the shooting button is pressed, the video shooting ends when the shooting button is released, or the image acquisition unit selects an image with high quality among a plurality of images which are obtained by automatically capturing an image for a marker by multiple times for a predetermined time before the shooting button is released.

4. The augmented reality contents generation and play system according to claim 2, wherein if the image acquisition unit obtains the image for a marker, the image acquisition unit sets the video and the image to have the same resolution, and thereby, the image with the same resolution as the video is obtained when a video shooting button is pressed.

5. The augmented reality contents generation and play system according to claim 2, wherein the augmented reality processing unit includes:

a marker detection unit configured to extract an image corresponding to the marker from an actual image which is recognized by the image acquisition unit, and detects the corresponding image by comparing the extracted image with information on a feature point of the image which is stored in the storage unit; and a tracking unit configured to recognize a video by extracting a type of the matched video among the videos that are stored in the storage unit from the image information which are detected by the marker detection unit.

6. The augmented reality contents generation and play system according to claim 2, wherein the control unit includes:

an input module configured to input a shooting button signal;

a contents generation module configured to obtain image and video data by outputting a signal to the storage unit and the mapping unit if a signal is input from the input module, and configured to assign a unique key value to the data and store the data;

a contents play module configured to recognize an image corresponding to the marker through the marker detection unit if an augmented reality application is executed, and configured to call a recognized photo and a mapped video by transmitting a signal to the mapping unit; and an image display module configured to play the video by overlaying the called video on a position of the marker of a display unit.

7. The augmented reality contents generation and play system according to claim 1, wherein, in the preview mode, if the video is stored when the shooting button is pressed and the storage of a video ends when the shooting button is released, the image acquisition unit automatically stores the image (marker) when the shooting button is pressed or when the shooting button is released, or automatically obtains the image when the storage of a video starts or ends by using a method of starting the storage of a video by pressing the shooting button and ending the storage of a video by pressing the shooting button again, or obtains the image by pressing the shooting button while the video is stored by using the method of starting the storage of a video by pressing the shooting button and ending the storage of a video by pressing the shooting button again.

8. The augmented reality contents generation and play system according to claim 1, wherein, if the image acquisition unit obtains a high resolution image for a marker, a plurality of or a predetermined number of images are automatically captured for initial predetermined time if the shooting button is pressed, and the video is automatically shot while the shooting button is pressed, the video shooting ends when the shooting button is released, or the image acquisition unit selects an image with high quality among a plurality of images which are obtained by automatically capturing an image for a marker by multiple times for a predetermined time before the shooting button is released.

9. The augmented reality contents generation and play system according to claim 8, wherein the augmented reality processing unit provides a UI which displays a plurality of specific frames of a video file that is obtained by the image acquisition unit on a screen, and controls such that an image that a user wants is selected to be used as a marker.

10. The augmented reality contents generation and play system according to claim 1, wherein if the image acquisition unit obtains the image for a marker, the image acquisition unit sets the video and the image to have the same resolution, and thereby, the image with the same resolution as the video is obtained when a video shooting button is pressed.

11. The augmented reality contents generation and play system according to claim 1, wherein the augmented reality processing unit provides a UI which displays a plurality of specific frames of a video file that is obtained by the image acquisition unit on a screen, and controls such that an image that a user wants is selected to be used as a marker.

12. The augmented reality contents generation and play system according to claim 1, wherein the augmented reality processing unit includes:
   a marker detection unit configured to extract an image corresponding to the marker from an actual image which is recognized by the image acquisition unit, and detects the corresponding image by comparing the extracted image with information on a feature point of the image which is stored in the storage unit; and
   a tracking unit configured to recognize a video by extracting a type of the matched video among the videos that are stored in the storage unit from the image information which are detected by the marker detection unit.

13. The augmented reality contents generation and play system according to claim 12, wherein mapping unit adds the feature point by adding a barcode or a predetermined pattern to a border of the captured image, and thereby the marker detection unit recognizes the marker.

14. The augmented reality contents generation and play system according to claim 1, wherein the control unit includes:
   an input module configured to input a shooting button signal;
   a contents generation module configured to obtain image and video data by outputting a signal to the storage unit and the mapping unit if a signal is input from the input module, and configured to assign a unique key value to the data and store the data;
   a contents play module configured to recognize an image corresponding to the marker through the marker detection unit if an augmented reality application is executed, and configured to call a recognized photo and a mapped video by transmitting a signal to the mapping unit; and
   an image display module configured to play the video by overlaying the called video on a position of the marker of a display unit.

15. An augmented reality contents generation and play method comprising:
   shooting a video in a preview mode of the image acquisition unit; obtaining at least one image and video data by operating a shooting button if an image to be captured is displayed in a preview mode, assigning a unique key value to the data, storing the data, also automatically storing a video in a predetermined time zone before and after a shooting point of time, and obtaining a high resolution image among the captured images;
   mapping the stored image onto the video by using the mapping unit and storing mapping information;
   printing the captured image;
   recognizing a photo corresponding to a marker by using the marker detection unit if augmented reality application is executed, and calling a video mapped onto the recognized photo by transmitting a signal to the mapping unit; and
   playing the video by overlaying the called video on a position of the marker of the image display unit.

16. The augmented reality contents generation and play method according to claim 15,
   wherein the obtaining includes obtaining a high resolution image file, and
   wherein, in order to obtain a high resolution image, if the image acquisition unit obtains a high resolution image for a marker, a plurality of or a predetermined number of images are automatically captured for initial predetermined time if the shooting button is pressed, and the video is automatically shot while the shooting button is pressed, the video shooting ends when the shooting button is released, or the image acquisition unit selects an image that a user wants among a plurality of images which are obtained by automatically capturing an image for a marker by multiple times for a predetermined time before the shooting button is released.

* * * * *